United States Patent Office 2,986,947
Patented June 6, 1961

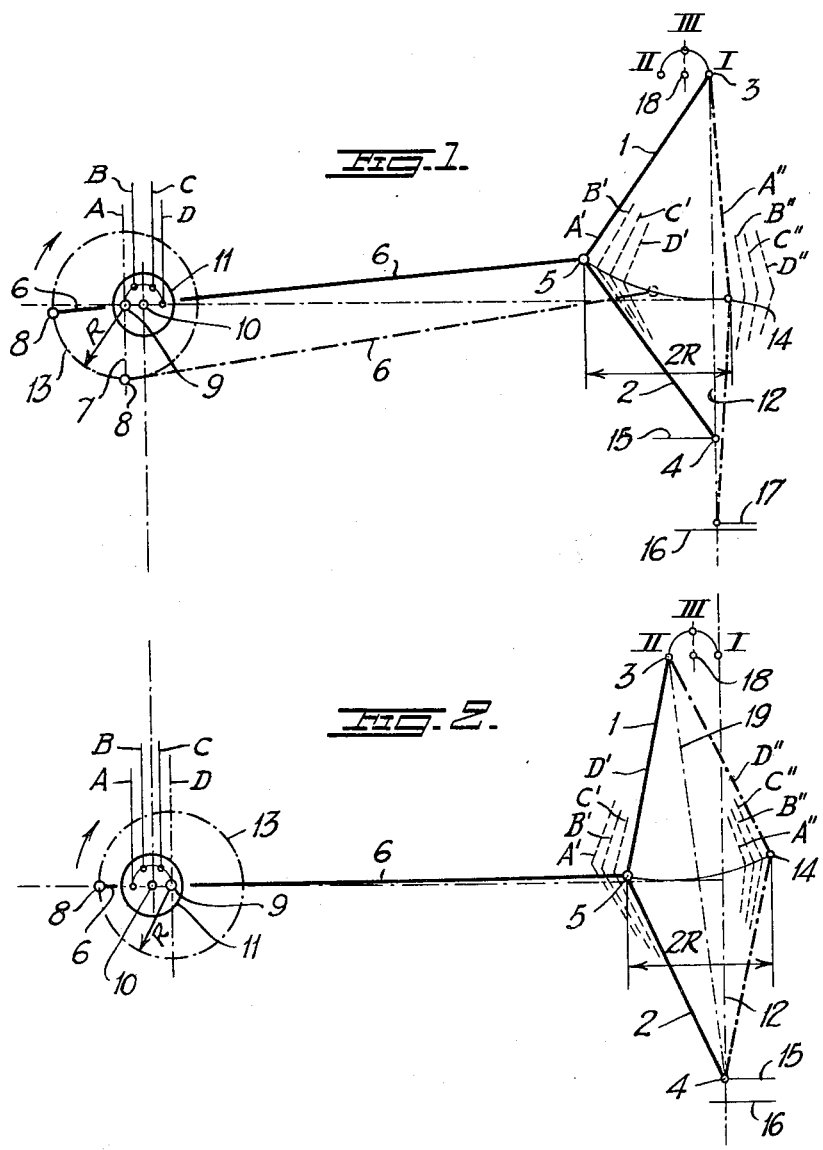

2,986,947
CONTROL MOVEMENT FOR CUTTING TOOL IN METAL PLATE CUTTING MACHINE
Anders Ingemar Knutsson Slettengren, Gothenburg, Sweden, assignor to Aktiebolaget Svelsmekano, Gothenburg, Sweden
Filed Apr. 17, 1956, Ser. No. 578,702
Claims priority, application Sweden Apr. 18, 1955
2 Claims. (Cl. 74—38)

The present invention refers to plate shearing machines of the type wherein a reciprocating movement is imparted to the chisel-shaped cutting tool by means of a two-armed toggle joint, which is provided with a fixed link-pin and a rectilineary movable link-pin secured in the tool holder, as well as with a third link-pin driven by means of a crank and connecting rod movement and oscillating in the plane of movement of the toggle joint. The invention relates to a contrivance for varying the length of stroke of the tool holder in correspondence to the plate thickness. A good shearing result requires that the length of stroke should only amount to a certain fraction, generally to 30–40% of the plate thickness. On the one hand, the length of stroke must be sufficiently great to cause a fracture in the plate material, but on the other hand, it must not be so great that the plate portion cut off is deformed in an undesirable manner. The proper length of stroke is also of particular importance when cutting in curves.

It is previously known to vary the length of stroke by arranging the fixed link-pin to be adjustable into different lateral positions relatively to a plane extending through the link-pin of the tool holder and paralleling the path of movement thereof. To the same end, it is also known to arrange the crank shaft to be adjustable into various positions laterally displaced relatively to said plane. According to the present invention, both of these arrangements known per se are combined in such manner that different desired lengths of stroke may be provided by a coordinated lateral adjustment both of the fixed link-pin and of the crank shaft. The invention is thus distinguished by the feature that the fixed link-pin and the crank shaft are individually adjustable into and fixable in various lateral positions relatively to the plane extending through the link-pin of the tool holder and paralleling the path of movement thereof. Hereby facilities have been provided for effecting with simple means a greater variation of the length of stroke than would be possible in each one of the previously known arrangements.

The invention is illustrated in the accompanying drawing, which in FIGS. 1 and 2 shows two motion diagrams for the toggle joint and the associated driving means.

The toggle joint consists of two link arms, 1, 2 of which the arm 1 is swingable about an adjustable link-pin 3 secured in the machine frame, whereas the other arm 2 is pivotally connected by a link-pin 4 to the tool holder, which latter is not shown. Both arms are interconnected by means of a third link-pin 5, which is connected through a connecting rod 6 to a crank 7 by a crank pin 8. The crank is rotatably arranged on a crank shaft 9, which is in turn eccentrically and fixedly arranged on a carrying member 11 rotatable about an axle 10 paralleling said crank shaft 9. By rotating said member 11 about said axle 10, the crank shaft may be adjusted into a number of fixable positions, four of which A, B, C, D are indicated in the example shown, said positions having different distances from the plane of movement 12 of the tool holder and the link-pin 4.

In the mutual position of the toggle joint and the crank shaft shown in FIG. 1, it is assumed that the fixed link-pin 3 is in the plane 12 or in the immediate propinquity thereof, whereas the crank shaft 9 is adjusted into its position of adjustment remotest from the plane 12. During the rotation of the crank shaft, the crank pin 8 will describe a circular path 13, a reciprocating oscillatory movement being then imparted to the toggle joint 1, 2. FIG. 1 shows the toggle joint and the link-pin 5 in the left extreme position. In the right extreme position the link-pin 5 is at the point 14, which in the example shown is on the other side of the plane 12 but at a small distance therefrom. If the radius of the circle 13 is designated by R, then the distance between the two extreme positions of the link-pin 5 approximately equals 2R. When the link-pin 5 is in its left extreme position, the link-pin 4 of the tool holder is in its upper extreme position 15. When the link-pin 5 passes through the plane 12, the link-pin 4 takes its lowermost position 16. The distance 15—16 thus constitutes the maximum length of stroke. When the link-pin 5 is in its right extreme position 14, the link-pin 4 takes a position 17 which is somewhat raised from the lower position 16. Thus a working stroke 15—16 and a smaller intermediate stroke 16—17 are obtained for each revolution of the crank shaft.

When the crank shaft 9 is in the position A and the stationary link pin 3 is in position I shown in FIG. 1, the crank pivot is spaced from the plane 12 a distance approximately equal to the length of the connecting rod 6 plus the throw radius R of the crank. With the stationary link pin and crank pivot in these positions, the greatest possible working stroke 15—16 is obtained, corresponding to the left extreme position A' of the toggle joint. By shifting the crank shaft to any of the other positions B, C, D, the length of stroke may be controlled. The extreme positions of the link arms 1, 2 will then be correspondingly displaced to the right, as indicated by dash lines B', C', D' and B'', C'', D'', the working stroke 15—16 being then reduced, whereas the intermediate stroke 16—17 is increased to a certain extent. The length of stroke thus depends on the distance of the link-pin from the plane 12 in the extreme positions.

The fixed link-pin 3 is eccentrically arranged on a carrying member rotatable about an axle 18. By shifting this carrying member approximately 180° from the position denoted by I to the position denoted by II, said link-pin 3 may thus be adjusted into a position which is laterally displaced relatively to the plane 12, as shown in FIG. 2. The positions I and II are chosen so that the lower link-pin 4 will take the same bottom position 16 in both of said positions. By shifting the link-pin 3 into an intermediate position III, the tool holder and the tool may be raised in known manner into an inoperative position.

In the position of the toggle joint shown in FIG. 2, with the crank shaft 9 adjusted into its position of adjustment D located nearest to the plane 12 and the stationary link pin 3 in position II, the crank pivot is spaced from a plane 19, connecting the stationary and movable toggle link pins, a distance approximately equal to the length of the connecting rod 6. The link-pin 5 then swings approximately equally far on both sides of the plane 19 extending through the two outer link-pins 3 and 4. The intermediate strokes then become of the same length as the working strokes 15, 16, whereby the tool operates with twice the number of working strokes in comparison with the arrangement according to FIG. 1. By shifting the crank shaft 9 into any of the positions A, B and C, the length of stroke may be varied, inasmuch as the extreme positions of the link arms 1, 2 will then be displaced to the left, as indicated by the dash lines A', B', C', and A'', B'', C'', respectively.

By combining the lateral adjustment of the fixed link-pin 3 and the crank shaft 9 relatively to the plane of movement 12 of the tool holder, as set forth hereinabove, great facilities are provided for varying the length of stroke by relatively small lateral adjustments of said link-pin and the crank shaft. Thus with the arrangements illustrated in the drawings it is possible by selectively positioning the stationary pivot pin 3 of the toggle and the crank pivot to obtain eight different stroke lengths at two different speeds, thus making it possible with a single machine to cut sheet metals of all thicknesses and a wide range of hardness and also to perform other operations such as banding, flanging and beading.

By adjustment of the stationary toggle pivot alone, as in the prior art, it is not practical to provide more than two stroke lengths since it is desirable to have the lower point of travel of the tool always the same to avoid continual adjustment of the lower, stationary tool. This limits the stationary toggle pivot to two positions which are in the same horizontal plane. Moreover, it is not practical to provide an adequate range of stroke lengths by varying the position of the crank pivot alone since this would require an eccentric, with such a large radius of eccentricity as to make it impractical to withstand the extremely high forces to which the eccentric would be subjected. The combination of selectively positioning both the crank pivot and the stationary toggle pivot in the particular relationship of the present invention makes it possible to obtain a universal machine with a wide range of speeds and stroke lengths while utilizing eccentrics having small radii of eccentricity so that they can easily be held in selected position. This also facilitates, inter alia, the transmission of motion between the stationarily arranged driving motor and the crank shaft which is adjustable into different positions relatively to the motor shaft. The crank shaft may be driven for instance from the motor shaft by means of V-belts, which are kept taut by means of a spring-loaded tension roller, so that the crank shaft may be shifted, without the motor being disconnected. Other means for the transmission of motion from the motor shaft to the crank shaft are obviously also conceivable.

The mutual arrangement of the crank shaft and the toggle joint may be varied in different ways. Thus the arrangement in FIG. 1 may be such that the motion diagram of the toggle joint becomes a reflected image of the diagram shown relatively to the plane 12, the crank shaft then simultaneously taking its extreme position nearest to the plane 12. In a similar manner, FIG. 2 may be altered so that the motion diagram of the toggle joint becomes a reflected image of the diagram shown relatively to the plane 12, the crank shaft then taking its extreme position remotest from the plane 12. The fixed link point positions I and II may also be displaced laterally to the right, so that the two planes 12, 19 coincide in FIG. 2, for example, and form an angle between them in FIG. 1.

What is claimed is:

1. In a machine for cutting and shearing metal plates and the like, a toggle-joint control movement for controllably varying the speed and length of the working stroke of a cutting tool, the movement comprising in operation two toggle links, a stationary link pin, a movable link pin, a tool holder connected to the movable pin and arranged to reciprocate rectilinearly, one of said links having an end pivotally connected to the stationary link pin and the other link having an end pivotally connected to the movable link pin, a connecting link pin pivotally connecting the other ends of said links with one another, driving means including a pivotally mounted crank and a connecting rod connected to said connecting link pin for oscillating the two links between selected extreme positions transversely of a first plane corresponding to a plane of reciprocal movement of said tool holder, first revolvable means for selectively angularly positioning the stationary link pin in a plurality of positions angularly disposed relative to each other including at least two extreme positions of which one is substantially in said first plane and the other is spaced transversely from said first plane, second revolvable means for selectively angularly positioning the crank pivot in a plurality of positions angularly disposed relative to each other including two extreme positions transversely of a second plane corresponding to a plane passing through the axis of rotation of said revolvable means and substantially parallel to the first plane and spaced therefrom, whereby the speed and length of the working stroke of the tool are adjustably controlled as a function of independent and combined angular positioning of the stationary link pin and the pivot of said crank, the extreme position of said crank pivot furthest from said first plane being spaced from a line connecting said stationary and movable link pins a distance approximately equal to the length of said connecting rod plus the throw radius of said crank when said stationary link pin is in an extreme position furthest from said second plane, and the opposite extreme position of said crank pivot is spaced from said line a distance approximately equal to the length of said connecting rod when said stationary link pin is in its opposite extreme position.

2. In a machine for cutting and shearing metal plates and the like, a toggle-joint control movement for controllably varying the speed and length of the working stroke of a cutting tool, the movement comprising in operation two toggle links, a stationary link pin, a movable link pin, a tool holder connected to the movable pin and arranged to reciprocate rectilinearly, one of said links having an end pivotally connected to the stationary link pin and the other link having an end pivotally connected to the movable link pin, a connecting link pin pivotally connecting the other ends of said links with one another, driving means including a pivotally mounted crank and a connecting rod connected to said connecting link pin for oscillating the two links between extreme positions transversely of a first plane corresponding to a plane of reciprocal movement of said tool holder, first revolvable means eccentrically carrying the stationary link pin thereon for selectively angularly positioning the stationary link pin in a plurality of positions angularly disposed relative to each other, including at least two extreme positions of which one is substantially in said first plane and the other is spaced transversely from said first plane, second revolvable means having the crank pivot eccentrically disposed thereon for selectively angularly positioning the crank pivot in a plurality of positions angularly disposed relative to each other including two extreme positions transversely of a second plane corresponding to a plane passing through the axis of rotation of said revolvable means and substantially parallel to the first plane and spaced therefrom, whereby the speed and length of the working stroke of the tool is adjustably controlled as a function of independent and combined angular positioning of the stationary link pin and the pivot of said crank, the extreme position of said crank pivot furthest from said first plane being spaced from a line connecting said stationary and movable link pins a distance approximately equal to the lengths of said connecting rod plus the throw radius of said crank when said stationary link pin is in an extreme position furthest from said second plane, and the opposite extreme position of said crank pivot is spaced from said line a distance approximately equal to the length of said connecting rod when said stationary link pin is in its opposite extreme position.

References Cited in the file of this patent

UNITED STATES PATENTS 2,494,413  Slettengren _____ Jan. 10, 1950

UNITED STATES PATENT OFFICE
CERTIFICATE OF CORRECTION

Patent No. 2,986,947                                 June 6, 1961

Anders Ingemar Knutsson Slettengren

It is hereby certified that error appears in the above numbered patent requiring correction and that the said Letters Patent should read as corrected below.

In the grant, lines 2 and 12, and in the heading to the printed specification, line 5, for "Aktiebolaget Svelsmekano", each occurrence, read -- Aktiebolaget Svetsmekano --.

Signed and sealed this 27th day of February 1962.

(SEAL)
Attest:

ERNEST W. SWIDER                                  DAVID L. LADD
Attesting Officer                                  Commissioner of Patents